(12) United States Patent
He et al.

(10) Patent No.: US 11,443,114 B1
(45) Date of Patent: Sep. 13, 2022

(54) COMPUTING SYSTEM FOR ENTITY DISAMBIGUATION AND NOT-IN-LIST ENTITY DETECTION IN A KNOWLEDGE GRAPH

(71) Applicant: Microsoft Technology Licensing, LLC, Redmond, WA (US)

(72) Inventors: Yujie He, Bothell, WA (US); Xiao Li, Stamford, CT (US); Wenjin Xu, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/352,902

(22) Filed: Jun. 21, 2021

(51) Int. Cl.
| | |
|---|---|
| *G06F 17/00* | (2019.01) |
| *G06F 40/279* | (2020.01) |
| *G06F 40/258* | (2020.01) |
| *G06N 5/02* | (2006.01) |
| *G06F 16/955* | (2019.01) |
| *G06F 40/134* | (2020.01) |

(52) U.S. Cl.
CPC ........ *G06F 40/279* (2020.01); *G06F 16/9558* (2019.01); *G06F 40/134* (2020.01); *G06F 40/258* (2020.01); *G06N 5/02* (2013.01)

(58) Field of Classification Search
CPC .... G06F 40/279; G06F 40/258; G06F 40/134; G06F 16/9558; G06N 5/02
See application file for complete search history.

(56) References Cited

U.S. PATENT DOCUMENTS

| | | | |
|---|---|---|---|
| 8,407,253 B2 * | 3/2013 | Ryu | G06F 16/9024 707/790 |
| 11,049,349 B2 * | 6/2021 | Onischuk | G07C 13/00 |
| 2015/0120623 A1 * | 4/2015 | Morara | G06N 5/003 706/12 |

(Continued)

FOREIGN PATENT DOCUMENTS

WO WO-2021002800 A1 * 1/2021

OTHER PUBLICATIONS

Wu, et al., "Scalable Zero-shot Entity Linking with Dense Entity Retrieval", arXiv:1911.03814, 2019, 11 Pages.

(Continued)

*Primary Examiner* — Laurie A Ries
(74) *Attorney, Agent, or Firm* — Calfee, Halter & Griswold LLP

(57) ABSTRACT

A computing system obtains computer-readable text comprising an identifier for an entity and an additional word. The computing system computes relevance scores for entries for entities in a computer-implemented knowledge graph upon the text, titles for the entities in the knowledge graph, and descriptions of the entities in the knowledge graph. The computing system determines whether the identifier for the entity is an acronym or a non-acronym. The computing system identifies an entry for the entity in the knowledge graph based upon the relevance scores and whether the identifier for the entity is an acronym or a non-acronym. The computing system generates a link between the identifier for the entity in the text and the entry for the entity in the knowledge graph, where data from the entry for the entity in the knowledge graph is presented to a user upon the link being selected.

20 Claims, 11 Drawing Sheets

(56) References Cited

U.S. PATENT DOCUMENTS

| | | | |
|---|---|---|---|
| 2015/0363476 A1* | 12/2015 | Li | G06F 16/258 |
| | | | 707/736 |
| 2020/0342055 A1* | 10/2020 | Patra | G06N 5/003 |
| 2021/0294970 A1* | 9/2021 | Bender | G10L 15/197 |
| 2022/0092028 A1* | 3/2022 | Layton | G06F 16/284 |

OTHER PUBLICATIONS

Humeau, et al., "Poly-Encoders: Architectures and Pre-Training Strategies for Fast and Accurate Multi-Sentence Scoring", arXiv:1905.01969, 2019, 14 Pages.

Qu, et al., "RocketQA: An Optimized Training Approach to Dense Passage Retrieval for Open-Domain Question Answering", arXiv:2010.08191, 2020, 13 Pages.

* cited by examiner

COMPUTING SYSTEM FOR ENTITY DISAMBIGUATION AND NOT-IN-LIST ENTITY DETECTION IN A KNOWLEDGE GRAPH

BACKGROUND

A knowledge graph is a computer-implemented data structure that relates entities (e.g., persons, places, things, ideas, and events) to attributes of the entities and/or other entities. Knowledge graphs may include general information about a wide variety of topics or may be restricted to a specific domain or enterprise. Knowledge graphs have applications in a variety of areas, including natural language processing (NLP), search engines, and social networks.

As a knowledge graph includes a plethora of information about entities, it is desirable to generate a link (e.g., a hyperlink) between an identifier for an entity referenced in text shown on a display (e.g., an identifier for an entity shown on a web page) and an entry in a knowledge graph assigned to the entity such that data from the entry that pertains to the entity is presented to a user upon the link being selected. Conventional approaches to entity linking assume the knowledge graph is complete and that a single correct entry for an entity referenced in text exists in the knowledge graph. However, conventional approaches to entity linking underperform when applied to incomplete, private, or domain-specific knowledge graphs; that is, conventional approaches may link an identifier for an entity in text to an entry in a knowledge graph that does not correspond to the entity.

SUMMARY

The following is a brief summary of subject matter that is described in greater detail herein. This summary is not intended to be limiting as to the scope of the claims.

Described herein are various technologies pertaining to linking entities referenced in computer-readable text to entries for the entities in a knowledge graph. In an example, a computing system computes relevance scores for entries for entities in a knowledge graph based upon an identifier for an entity (also referred to a mention) in the text, additional words in the text, titles of the entities in the knowledge graph, and descriptions of the entities in the knowledge graph. The computing system selects an entry in the knowledge graph based upon a relevance score for the entry and compares the relevance score to different threshold scores depending on whether the identifier for the entity is an acronym or a non-acronym. The computing system generates a link between the identifier for the entity in the text and the entry in the knowledge graph based upon the comparison, where data from the entry in the knowledge graph is presented to a user via a computing device upon the link being selected, and where the data corresponds to the entity.

In another example, a computing system obtains computer-readable text that includes an identifier for an entity and at least one additional word. The computing system recognizes the identifier for the entity in the text. The computing system identifies entries for entities in a knowledge graph (e.g., an enterprise knowledge graph for an enterprise) based upon the identifier for the entity. The computing system computes relevance scores (with respect to the entity referenced in the text) for the entries in the knowledge graph based upon the text, titles for the entities in the knowledge graph, and descriptions of the entities in the knowledge graph. The computing system assigns ranks to the entries based upon their respective relevance scores. According to embodiments, a transformer-based encoder, such as a cross-encoder, generates the scores. The computing system selects an entry from amongst the entries based upon the ranks. For instance, the computing system selects the entry that has a highest rank.

According to some embodiments, the computing system determines whether the identifier for the entity in the text is an acronym or a non-acronym. When the identifier for the entity is an acronym, the computing system compares the relevance score for the entry in the knowledge graph to a first threshold score. When the relevance score is greater than or equal to the first threshold score, the entry in the knowledge graph corresponds to the entity referenced in the text and the computing system generates a link between the identifier for the entity in the text and the entry in the knowledge graph. When the relevance score is less than the first threshold score, the computing system identifies the entity referenced in the text as a not-in-list entity, that is, the entity referenced in the text does not have a corresponding entry in the knowledge graph, and hence the computing system does not generate the link. When the identifier for the entity is a non-acronym, the computing system compares the relevance score for the entry in the knowledge graph to a second threshold score that is different than the first threshold score. When the relevance score is greater than or equal to the second threshold score, the computing system generates the link. When the relevance score is less than the second threshold score, the entity referenced in the text is a not-in-list entity and the computing system does not generate the link. In an example, the text is presented on a display and the link is a hyperlink that is embedded in the identifier for the entity in the text. When the link is selected by a user, data from the entry in the knowledge graph is retrieved and presented on the display to the user, where the data pertains to the entity.

The above-described technologies present various advantages over conventional approaches to entity linking. First, unlike conventional approaches which assume a public knowledge graph, the above-described technologies are domain agnostic and can operate on new and unseen knowledge graphs (e.g., private knowledge graphs). Second, the above-described technologies explicitly account for not-in-list entities (e.g., entities that are not referenced in a knowledge graph), whereas conventional technologies assume that a knowledge graph is complete and that mentions of an entity can be linked to an existing entry in the knowledge graph. This is useful for enterprise or domain-specific knowledge graphs, which tend to include less information that public knowledge graphs. Third, unlike conventional approaches, the above-described technologies treat acronym and non-acronym entity linking separately and flexibly, which tends to lead to more accurate entity linking. This is useful for enterprise knowledge graphs, as an acronym used by an enterprise may have a different meaning to the enterprise than to the public at large.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

Figure 1:
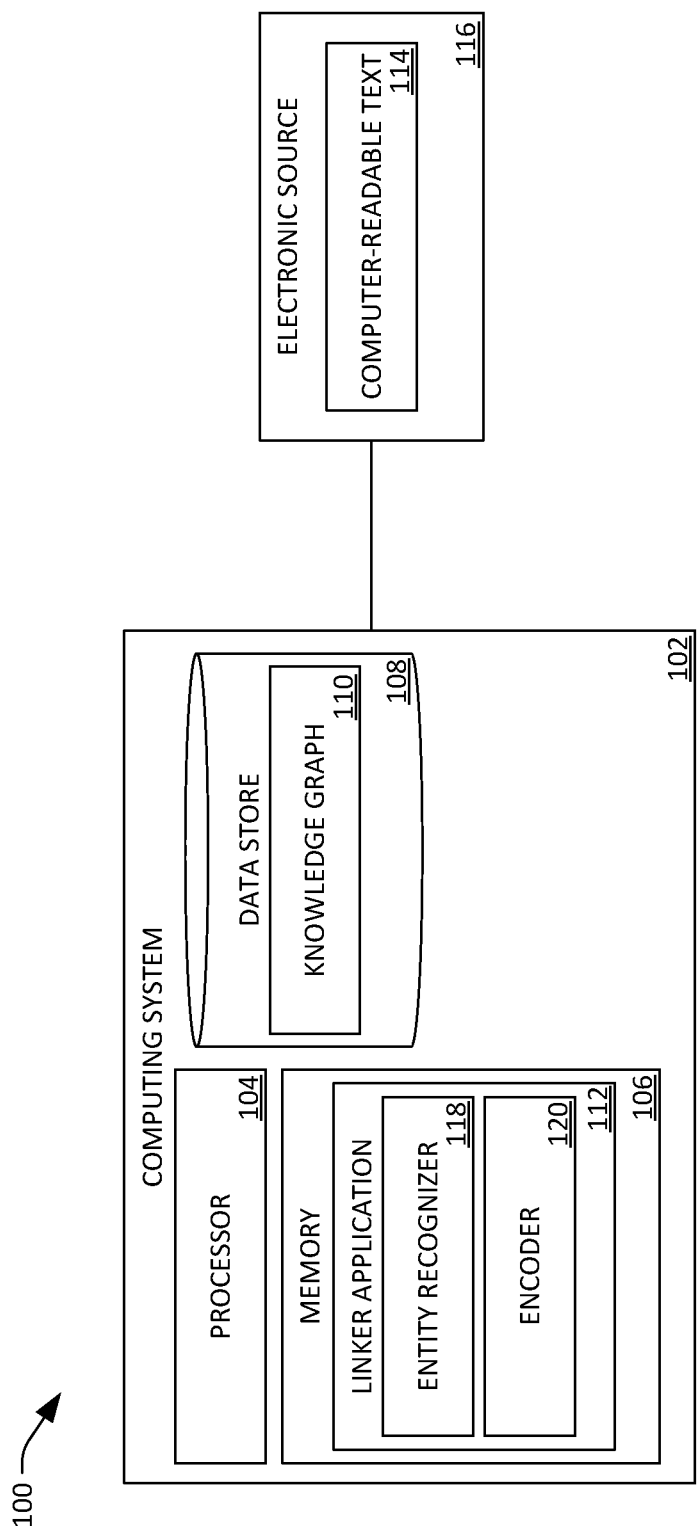
FIG. 1 is a functional block diagram of an example computing environment that facilitates linking entities referenced in computer-readable text to entries for the entities in knowledge graphs.

Various technologies pertaining to linking an entity referenced in computer-readable text to an entry for the entity in a knowledge graph are now described with reference to the drawings, where like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

DETAILED DESCRIPTION

As noted above, conventional approaches to linking mentions of entities in text to entries in a knowledge graph suffer from various problems. First, conventional approaches tend to assume that the knowledge graph is complete and that a mention of an entity in text can always be linked to an entry in a knowledge graph. However, this is not always true, particularly in the case of enterprise or domain-specific knowledge graphs, which tend to include less information than publicly available knowledge graphs such as Wikipedia®. Second, conventional approaches tend not to distinguish between acronym and non-acronym mentions of entities in text. This can be problematic in enterprise contexts in which an acronym used by an enterprise differs from use of the acronym by the public at large. In an example, the acronym "CXR" stands for "Company X Research" in the context of Company X, but stands for "Chest X-ray" in a public context. Furthermore, a knowledge graph may include entries for different entities that share the same name (e.g., a first entry for a first person named "Joe Johnson" and a second entry for a second person named "Joe Johnson") and it is challenging to disambiguate between the different entities.

To address these issues, a computing system is described herein that is configured to generate a link between an identifier for an entity referenced in text and an entry in a knowledge graph that is assigned to the entity. The computing system generates the link by computing, with respect to the entity referenced in the text, relevance scores for entries for entities in the knowledge graph and by selecting an entry from amongst the entries based upon the relevance scores. The computing system utilizes different criteria in determining whether or not to generate the link based upon whether the identifier for the entity in the text is an acronym or a non-acronym. When the link is selected by a user, data from the entry in the knowledge graph is presented on a display to a user, where the data pertains to the entity.

Briefly, a computing system obtains computer-readable text that includes an identifier for an entity and at least one additional word. In an example, the text includes "The pace of innovation in computer science is fast and exciting with Company X Research and its collaboration with the academic community." The computing system identifies and selects the identifier for the entity (e.g., "Company X Research") in the text. The computing system identifies entries for entities in a knowledge graph (e.g., an enterprise knowledge graph for an enterprise) based upon the identifier for the entity. The computing system computes relevance scores for the entries in the knowledge graph based upon the text, titles for the entities in the knowledge graph, and descriptions of the entities in the knowledge graph and assigns ranks to the entries based upon their respective relevance scores. According to embodiments, a transformer-based encoder generates the scores. The computing system selects an entry from amongst the entries based upon the rankings. For instance, the computing system selects a highest ranked entry.

According to some embodiments, the computing system determines whether the identifier for the entity in the text is an acronym or a non-acronym. When the identifier for the entity is an acronym, the computing system compares the relevance score for the entry in the knowledge graph to a first threshold score. When the relevance score is greater than or equal to the first threshold score, the entry in the knowledge graph corresponds to the entity referenced in the text and the computing system generates a link between the identifier for the entity in the text and the entry in the knowledge graph. When the relevance score is less than the first threshold score, the computing system identifies the entity referenced in the text as a not-in-list entity, that is, the entity referenced in the text does not have a corresponding entry in the knowledge graph, and hence the computing system does not generate the link. When the identifier for the entity is a non-acronym, the computing system compares the relevance score for the entry in the knowledge graph to a second threshold score that is different than the first threshold score. When the relevance score is greater than or equal to the second threshold score, the computing system generates the link. When the relevance score is less than the second threshold score, the entity referenced in the text is a not-in-list entity and the computing system does not generate the link. When the link is selected by a user, data from the entry in the knowledge graph is retrieved and presented on the display to the user, where the data pertains to the entity.

In an example, the text is presented on a display and the link is a hyperlink that is embedded in the identifier for the entity in the text. When the link is selected by a user, data from the entry in the knowledge graph is retrieved and presented on the display to the user, where the data pertains to the entity. Following the specific example given above with "Company X Research", the data includes a description of "Company X Research", people associated with "Company X Research", websites associated with "Company X Research", and so forth.

The above-described technologies present various advantages over conventional approaches to entity linking. First, unlike conventional approaches which assume a public knowledge graph, the above-described technologies are domain agnostic and can operate on new and unseen knowledge graphs (e.g., private knowledge graphs). Second, the above-described technologies explicitly account for not-in-list entities (e.g., entities that are not referenced in a knowledge graph), whereas conventional technologies assume that a knowledge graph is complete and that mentions of an entity can be linked to an existing entry in the knowledge graph. This is useful for enterprise or domain-specific knowledge graphs, which tend to include less information that public knowledge graphs. Third, unlike conventional approaches, the above-described technologies treat acronym and non-acronym entity linking separately and flexibly, which tends to lead to more accurate entity linking. This is useful for enterprise knowledge graphs, as an acronym used by an enterprise may have a different meaning to the enterprise than to the public at large.

With reference to FIG. 1, an example computing environment 100 that facilitates linking entities referenced in computer-readable text to entries for the entities in knowledge graphs is illustrated. The computing environment 100 includes a computing system 102. According to some embodiments, the computing system 102 is a server computing device. According to other embodiments, the computing system 102 is a cloud-based computing platform. The computing system 102 includes a processor 104, memory 106, and a data store 108.

The data store 108 stores a knowledge graph 110 (sometimes also referred to as a knowledge base). According to some embodiments, the knowledge graph 110 is an enterprise knowledge graph for an enterprise (e.g., an organization) or a domain-specific knowledge graph that is specific to a particular domain. According to other embodiments, the knowledge graph 110 is a public knowledge graph that stores information pertaining to a wide variety topics and that is available to the public. Although not depicted in FIG. 1, it is to be understood that the data store 108 may stores many different knowledge graphs.

The knowledge graph 110 includes nodes and edges connecting the nodes, where the nodes represent entities (e.g., people, places, things, ideas, events, etc.) or attributes of the entities and where the edges are indicative of relationships between the entities themselves or relationships between the entities and the attributes. In an example, a first node in the knowledge graph 110 represents a research team, a second node in the knowledge graph 110 represents a researcher, and a first edge in the knowledge graph 110 that connects the first node and the second node is assigned criteria that indicates that the researcher belongs to the research team. In another example, a third node in the knowledge graph 110 represents a date, and the second node is connected to the third node in the knowledge graph 110 via a second edge that is assigned criteria that indicates that the researcher was born on the date. Nodes in the knowledge graph 110 that represent entities may be assigned unique identifiers so as to disambiguate entities that share the same name. According to some embodiments, nodes and/or edges within the knowledge graph 110 comprise metadata that enables information about the entities to be retrieved. According to some embodiments, nodes and/or edges within the knowledge graph 110 store information about the entities.

According to embodiments, an entry for an entity in the knowledge graph 110 is represented by a node for the entity in the knowledge graph 110 and nodes (representing other entities and/or attributes) that are connected to the node via edges. The entry for the entity includes a title for the entity (e.g., a name of the entity) and a description of the entity, where the title of the entity and the description of the entity are based upon the node for the entity, the nodes (representing other entities and/or attributes) to which the node is connected, and the edges connecting the node to the nodes. According to embodiments, the description of the entity is a sentence about the entity. In an example, the description of the entity includes identifiers for other entities (represented by nodes connected to the node representing the entity) and relationships of the other entities to the entity (represented by the edges connecting the node to the nodes), as well as attributes of the entity (also represented by nodes connected to the node representing the entity).

Figure 2:
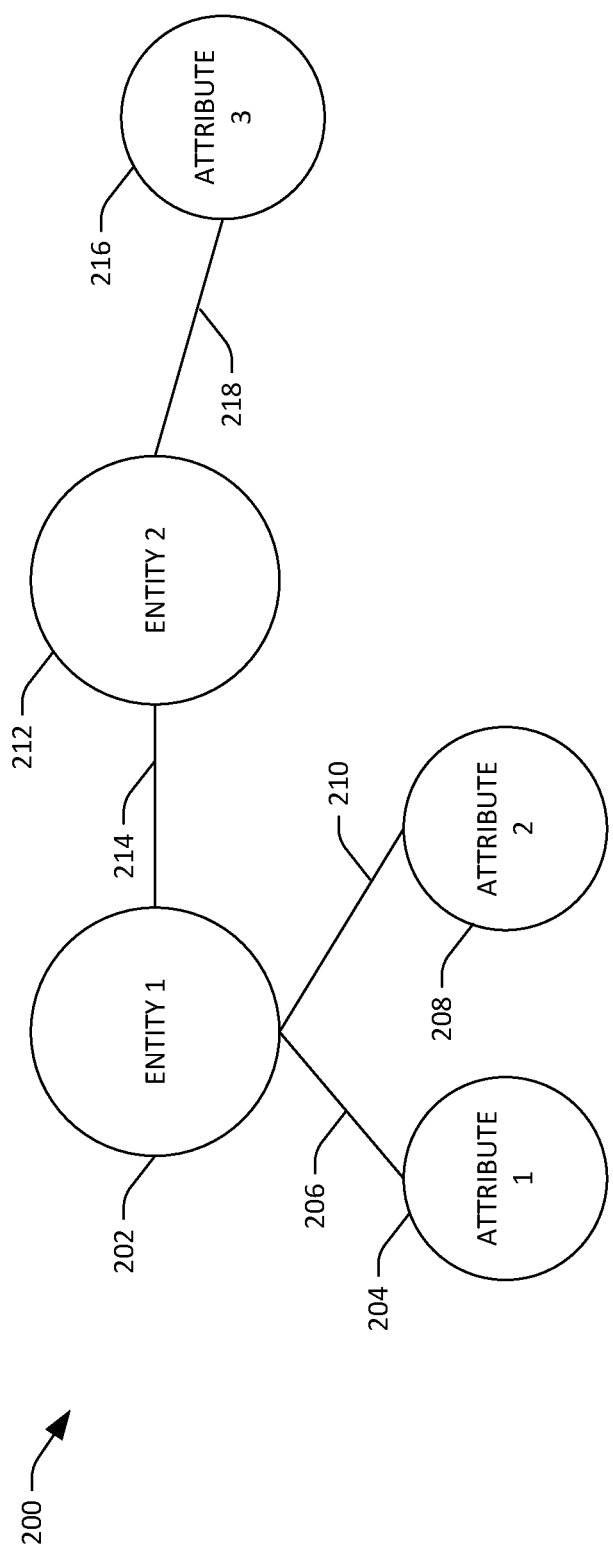
FIG. 2 is an illustration of an example knowledge graph.

Turning now to FIG. 2, an example knowledge graph 200 is illustrated. The knowledge graph 200 may be or include the knowledge graph 110 or the knowledge graph 110 may be or include the knowledge graph 200. The knowledge graph 200 includes a first node 202 that represents a first entity. The first node 202 is connected to a second node 204 via a first edge 206, where the second node 204 represents a first attribute and where the first edge 206 is assigned criteria indicating that the first entity has the first attribute. The knowledge graph 200 further includes a third node 208 that is connected to the first node 202 by a second edge 210, where the third node 208 represents a second attribute and where the second edge 210 is assigned criteria indicating that the first entity has the second attribute. The knowledge graph 200 further includes a fourth node 212 that is connected to the first node 202 by a third edge 214, where the fourth node 212 represents a second entity and where the third edge 214 is assigned criteria that is indicative of a relationship between the first entity and the second entity. The knowledge graph 200 further includes a fifth node 216 that is connected to the fourth node 212 by a fourth edge 218, where the fifth node 216 represents a third attribute and where the fourth edge 218 is assigned criteria indicating that the second entity has the third attribute.

Turning back to FIG. 1, the memory 106 has a linker application 112 loaded therein. In general, the linker application 112 is configured to generate a link between an identifier for an entity (also referred to herein as "a mention of an entity") in computer-readable text 114 and an entry for the entity in the knowledge graph 110. When the link is selected, data from the entry for the entity in the knowledge graph 110 is presented to a user. The text 114 is stored in and/or originates from an electronic source 116. According to some embodiments, the electronic source 116 is the data store 108. According to some embodiments, the electronic source 116 is a server computing device that is in network communication with the computing system 102. According to some embodiments, the electronic source 116 is a computing device operated by a user that is in network communication with the computing system 102. According to embodiments, the text 114 is included in a document, an email, a real-time message, or a web page that is stored in and/or originates from the electronic source 116.

Figure 3:
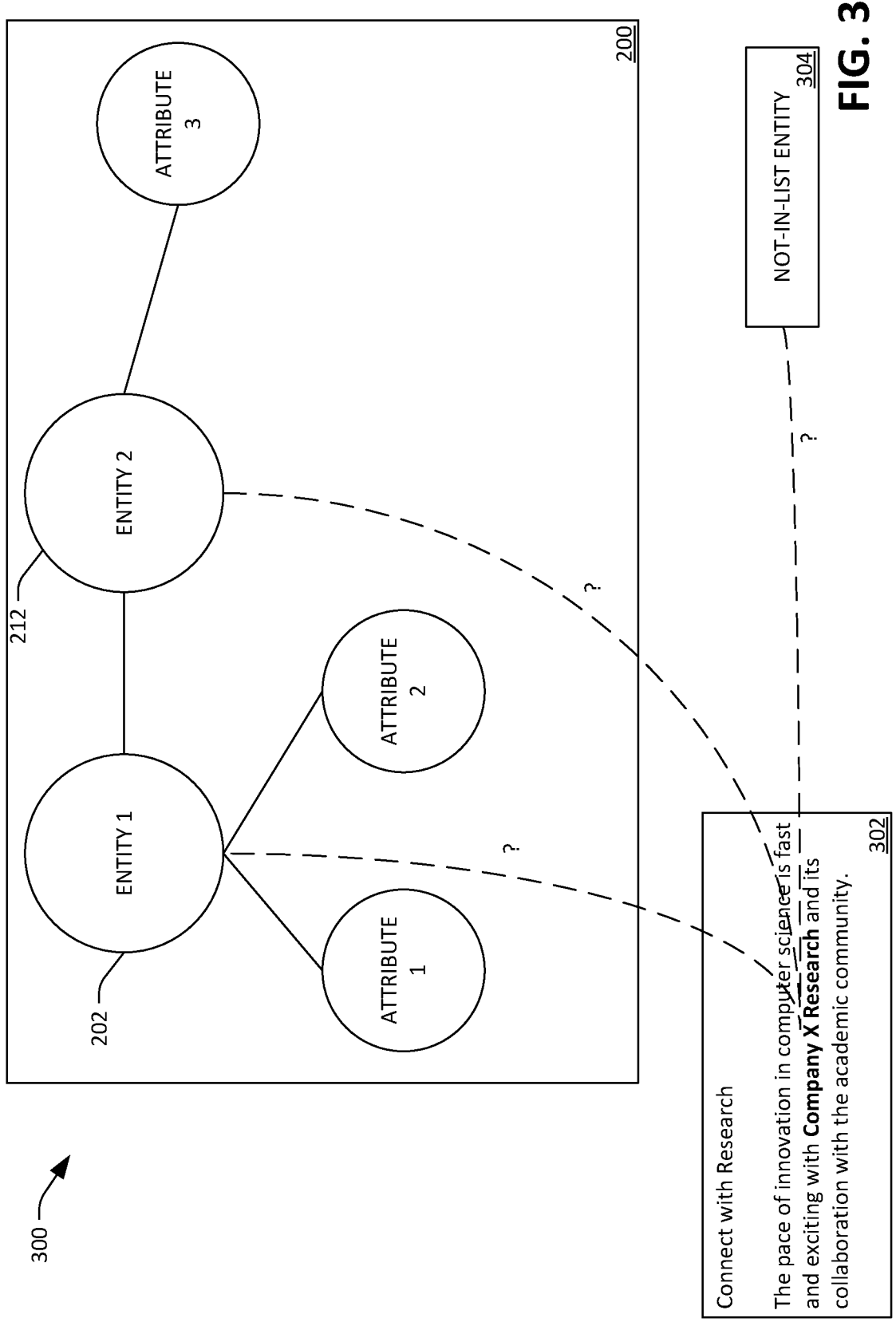
FIG. 3 is a depiction of an example process performed by a linker application.

Referring now to FIG. 3, a depiction 300 of an example process performed by the linker application 112 is illustrated. The depiction 300 includes the knowledge graph 200 described above. The depiction 300 also includes computer-readable text 302. In an example, the text 302 is the text 114. In the example illustrated in FIG. 3, the text 302 includes an identifier for an entity ("Company X Research") and at least one additional word ("The pace of innovation in computer science is fast and exciting with . . . and its collaboration with the academic community"). The linker application 112 is configured to (1) determine which node (e.g., the first node 202 or the fourth 212) in the knowledge graph 200 represents the entity in the text 302 and (2) generate a link between the identifier for the entity in the text 302 and the node in the knowledge graph 200 that represents the entity. When the knowledge graph 200 does not include a node representing the entity referenced in the text 302, the linker application 112 is configured to identify the entity in the text 302 as a not-in-list entity 304. When the entity in the text 302 is a not-in-list entity 304, the linker application 112 does not generate a link between the identifier for the entity in the text 302 and a node in the knowledge graph 200.

In an example, the linker application 112 determines that "Company X Research" is represented by the first node 202 in the knowledge graph 200 and the linker application 112 generates a link between "Company X Research" in the text 302 and the first node 202 (represented by a dotted line in FIG. 3). In an example, the link is a hyperlink that is embedded in "Company X Research" in the text 302. When the link is selected, data from the knowledge graph 200 pertaining to "Company X Research" is presented to a user. In an example, the data indicates that "Company X Research" has the first attribute and the second attribute and that "Company X Research" has some relation to the second entity.

Turning back to FIG. 1, the linker application 112 includes an entity recognizer 118. The entity recognizer 118 is configured to recognize and select an identifier for an entity in the text 114. According to some embodiments, the entity recognizer 118 is a computer-implemented machine learning model. In some embodiments, the machine learning model is a transformer model. In some embodiments, the machine learning model is a similarity model configured to measure contextual similarity between entity mentions and entities in the knowledge graph. The linker application 112 further includes an encoder 120. In general, the encoder 120 is configured to compute a relevance score for an entry in the knowledge graph 110 based upon the text 114 (which includes an identifier for an entity and at least one additional word), a title of the entity in the knowledge graph 110, and a description of the entity in the knowledge graph 110. In general, a relevance score for an entry in the knowledge graph 110 is indicative of a contextual similarity between the text 114 (e.g., the identifier for the entity and the at least one additional word) and the entry for the entity (e.g., the title and the description) in the knowledge graph 110. A relatively high relevance score for the entry indicates that the entry likely corresponds to the entity referenced in the text 114, while a relatively low relevance score for the entry indicates that the entry likely does not correspond to the entity referenced in the text 114. According to embodiments, the encoder 120 is trained using a multi-stage hard negative entity candidates retrieval pipeline.

Figure 4:
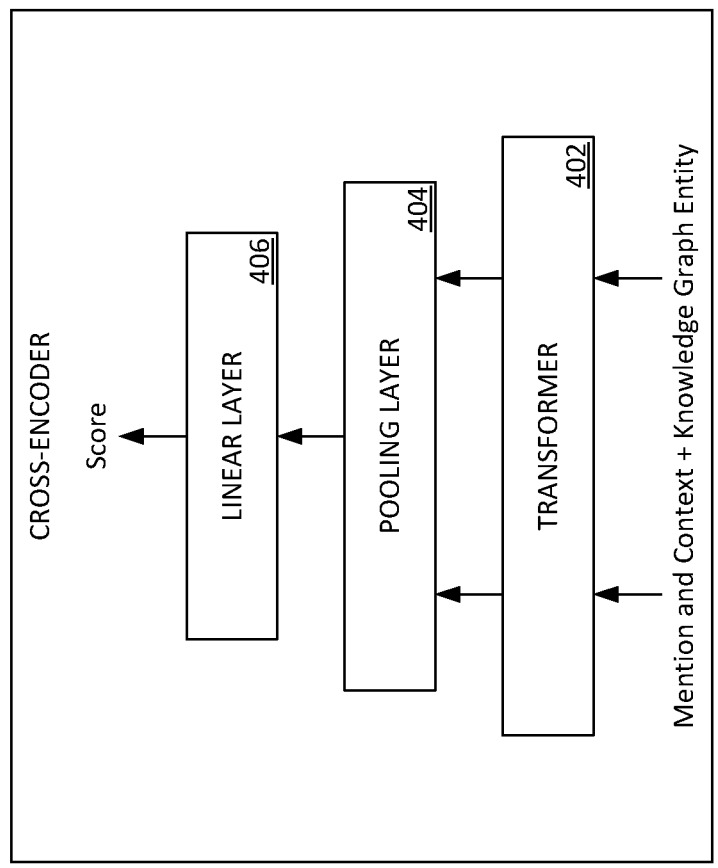
FIG. 4 is a functional block diagram of an example cross-encoder.

Turning now to FIG. 4, an example cross-encoder 400 is illustrated. The encoder 120 may be or include the cross-encoder 400 or the cross-encoder 400 may be or include the encoder 120. The cross-encoder 400 generates a concatenation (e.g., a string) of elements from the text 114, elements from an entry in the knowledge graph 110, and a plurality of tokens and provides the concatenation to a transformer 402. The cross-encoder 400 includes a transformer 402 that generates a vectorized representation of the text 114 and the entry based upon the concatenation. In an example, the cross-encoder 400 generates the concatenation according to equation (I).

$$\text{concatenation} = [CLS] + \text{context\_left} + [M]\text{mention}[/M] + \text{context right} + [SEP] + \text{entity title} + [ENT] + \text{entity description} \quad (I)$$

In equation (I), [CLS] represents a classifier token, context_left are the word or words in the text 114 that occur before the identifier for the entity in the text 114, [M] represents an opening mention token, mention is the identifier for the entity in the text 114, [/M] represents an ending mention token, context right are the word or words in the text 114 that occur after the identifier for the entity in the text 114, [SEP] represents a separator token that separates the text 114 from the entry in the knowledge graph 110, entity title is the title of an entry in the knowledge graph 110, [ENT] is a token representing an entity, and entity description is the description of an entry in the knowledge graph 110. In an example, each entry in the vectorized representation is an embedding (e.g., a 768-dimension embedding) of an element in equation (I) (e.g., [CLS], context_left (with each word in context-left having a different embedding in the vectorized representation), [M], [/M], and so forth).

The cross-encoder 400 includes a pooling layer 404 that reduces dimensionality of the vectorized representation from a first dimensionality to a second dimensionality, where the first dimensionality is greater than the second dimensionality. According to embodiments, the pooling layer 404 performs mean (also referred to as average) pooling based upon the [M] and [/M] tokens. The cross encoder 400 also includes a linear layer 406 that reduces the (reduced) vectorized representation to a scalar value, where the scalar value is the relevance score. According to embodiments, the linear layer 406 is a neural network.

Figure 5:
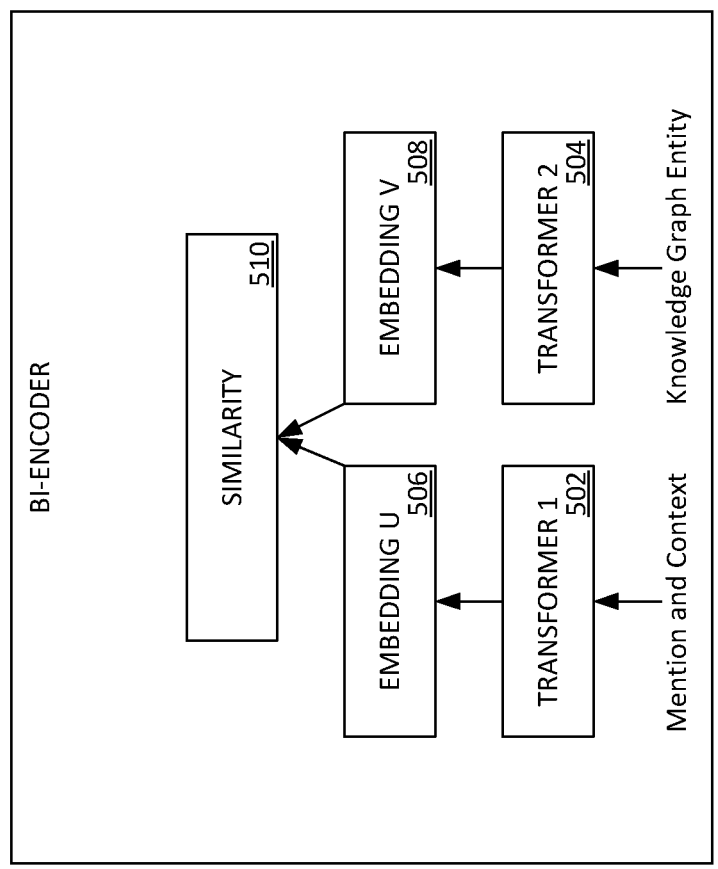
FIG. 5 is a functional block diagram of an example bi-encoder.

Referring now to FIG. 5, an example bi-encoder 500 is illustrated. The encoder 120 may be or include the bi-encoder 500 or the bi-encoder 500 may be or include the encoder 120. The bi-encoder 500 generates a first concatenation of elements from the text 114 and a first plurality of tokens. The bi-encoder 600 also generates a second concatenation of elements from an entry in the knowledge graph 110 and a second plurality of tokens. In an example, the bi-encoder 500 generates the first concatenation and the second concatenation according to equations (II) and (III), respectively.

$$\text{first concatenation} = [CLS] + \text{context\_left} + [M]\text{mention}[/M] + \text{context right} \quad (II)$$

$$\text{second concatenation} = [CLS] + \text{entity title} + [ENT] + \text{entity description} \quad (III)$$

The bi-encoder 500 includes a first transformer 502 that generates an embedding u 506 of the text 114 based upon the first concatenation and a second transformer 504 that generates an embedding v 508 of the entry in the knowledge graph 110 based upon the second concatenation. The bi-encoder 500 includes a similarity component 510 that calculates a similarity metric between the embedding u 506 and the embedding v 508, where the similarity metric may be used as the relevance score for the entry. According to embodiments, the similarity metric is cosine similarity.

According to embodiments, the encoder 120 is trained based upon publicly available data, that is, data from a public knowledge graph and mentions of entities in text (e.g. Wikipedia). In some embodiments, the publicly available data does not include negative training samples. In an example, negative training samples are generated according to the following procedure. First, the computing system 102 executes a search over the knowledge graph 110 based upon an identifier for an entity referenced in text, where the search produces search results that includes entries in the knowledge graph. Second, the computing system 102 selects a threshold number of the search results (e.g., the top twenty search results). Third, the computing system 102 utilizes a bi-encoder (trained on an ambiguous data set) to select out negative training samples from amongst the threshold number of search results. The negative training samples may then be used to train the encoder 120 (in conjunction with training samples from the publicly available data).

With reference generally now to FIGS. 1-5, example operation of the computing environment 100 is now set forth. The linker application 112 obtains (e.g., receives or accesses) the text 114 from the electronic source 116. The text 114 includes an identifier for an entity and at least one additional word. The linker application 112 utilizes the entity recognizer 118 to identify and select the identifier for the entity in the text 114.

The linker application 112 executes a search over the knowledge graph 110 based upon the identifier for the entity in the text 114. The search produces search results, where the search results include entries for entities in the knowledge graph 110. The search results may or may not include an entry in the knowledge graph 110 that corresponds to the entity in the text 114.

The linker application 112 computes relevance scores for each of the entries (from the search results) based upon the text 114, titles for the entities in the knowledge graph 110, and descriptions of the entities in the knowledge graph 110. In an example, the linker application 112 computes a relevance score for an entry in the knowledge graph 110 by generating a concatenation (e.g., a string) that includes the identifier for the entity from the text 114, a word or words in the text 114 that occur before the identifier for the entity in the text 114, a word or words in the text 114 that occur after the identifier for the entity in the text 114, a title of the entry in the knowledge graph 110, a description of the entry in the knowledge graph 110, and a plurality of tokens. The linker application 112 provides the concatenation to the encoder 120, where the encoder 120 outputs the relevance score based upon the concatenation.

The linker application 112 assigns ranks to each of the entries (from the search results) based upon their corresponding relevance scores. The linker application 112 selects an entry from the entries based upon a relevance score for the entry. In an example, the linker application 112 selects an entry from amongst the entries that has a highest ranked relevance score from amongst the relevance scores.

According to some embodiments, the linker application 112 determines whether the identifier for the entity in the text 114 is an acronym or a non-acronym. According to some embodiments, the linker application 112 determines whether each character in the identifier for the entity referenced in the text 114 is capitalized. When each character is capitalized, the linker application 112 determines that the identifier for the entity in the text 114 is an acronym. When each character is not capitalized, the linker application 112 determines that the identifier for the entity in the text 114 is a non-acronym. According to other embodiments, the linker application 112 utilizes a dictionary to determine whether the identifier for the entity in the text 114 is an acronym or a non-acronym.

According to some embodiments, when identifier for the entity in the text 114 is an acronym, the linker application 112 compares the relevance score for the entry to a first threshold score. When the relevance score is greater than or equal to the first threshold score, the linker application 112 generates a link (described in detail below) between the identifier for the entity in the text 114 and the entry for the entity in the knowledge graph 110. When the relevance score is less than the first threshold score, the linker application 112 identifies the entity referenced in the text 114 as a not-in-list entity (e.g., the entity referenced in the text 114 does not have a corresponding entry in the knowledge graph 110) and does not generate the link. According to some embodiments, the first threshold score is experimentally determined.

According to some embodiments, when the identifier for the entity in the text 114 is a non-acronym, the linker application 112 compares the relevance score for the entry to a second threshold score that is different than the first threshold score. When the relevance score is greater than or equal to the second threshold score, the linker application 112 generates the link (described in detail below) between the identifier for the entity in the text 114 and the entry for the entity in the knowledge graph 110. When the relevance score is less than the second threshold score, the linker application 112 identifies the entity referenced in the text 114 as a not-in-list entity and does not generate the link. According to some embodiments, the second threshold score is experimentally determined. According to some embodiments, when the linker application 112 identifies the entity referenced in the text 114 as a not-in-list entity, the linker application 112 outputs an indication to a computing device indicating that the entity referenced in the text 114 is not linkable to an entry in the knowledge graph 110.

When the link is selected by a user, data from the entry for the entity in the knowledge graph 110 is presented to the user. In an example, the link is a hyperlink that is embedded in the text 114 by the linker application 112, that is, the hyperlink is embedded in the identifier for the entity in the text 114. When the hyperlink is selected, the user is presented with data from the (linked) entry in the knowledge graph 110, where the data pertains to the entity. In another example, the link is a graphical icon located proximate to the identifier for the entity in the text 114. When the graphical icon is selected, the user is presented with the data from the (linked) entry in the knowledge graph 110. According to embodiments, the link includes metadata for the entity referenced in the text 114. In an example, the metadata includes an identifier for the knowledge graph 110, an identifier for an entry in the knowledge graph 110 corresponding to the entity referenced in the text 114, and so forth.

Figure 6:
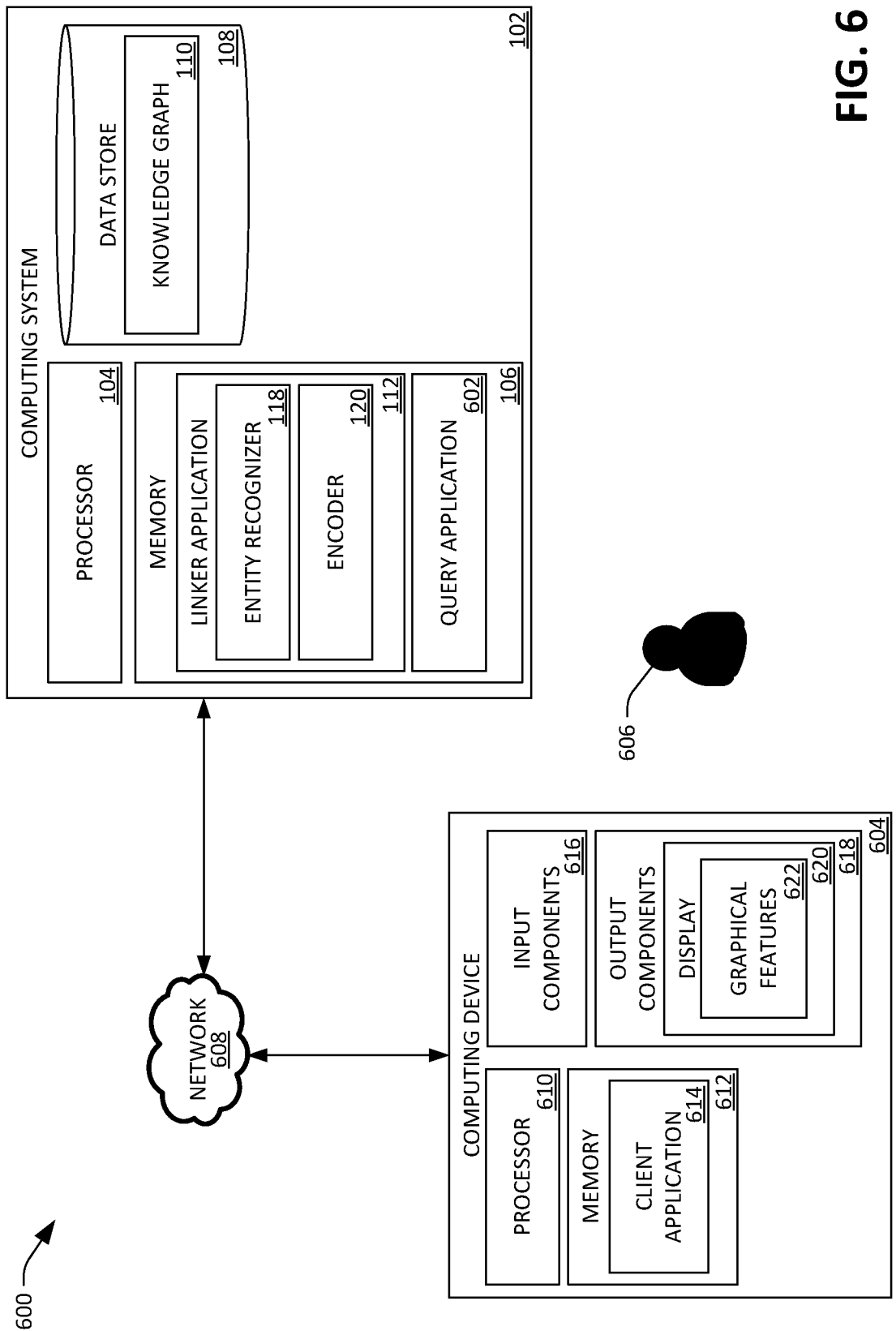
FIG. 6 is a functional block diagram of an example computing environment that facilitates delivering information about an entity referenced in a knowledge graph to a user.

Referring now to FIG. 6, an example computing environment 600 that facilitates delivering information about an entity in a knowledge graph to a user is illustrated. The computing environment 600 includes the computing system 102 described above in the description of FIG. 1. In the computing environment 600, the computing system 102 additionally includes a query application 602 that is configured to query the knowledge graph 110 (or other knowledge graphs) and to return data from the knowledge graph 110 to users.

The computing environment 600 additionally includes a computing device 604 that is operated by a user 606. In an example, the computing device 604 is a desktop computing device, a laptop computing device, a tablet computing device, or a smartphone. The computing device 604 is in communication with the server computing device 102 by way of a network 608 (e.g., the Internet, intranet).

The computing device 604 includes a processor 610 and memory 612, where the memory 612 has a client application 614 loaded therein. The client application 614 is generally configured to present text to the user 606, where the text includes an identifier for an entity and where the identifier for the entity has been linked to an entry in the knowledge graph 110 corresponding to the entity using the processes described above. According to embodiments, the client application 614 is a web browser that displays a web page that includes the text.

The computing device 604 further includes input components 616 that enable the user 606 to set forth input to the computing device 604. In an example, the input components 616 include a mouse, a keyboard, a trackpad, a scroll wheel, a microphone, a camera, a video camera, a controller, and/or a touchscreen. The computing device 604 also includes output components 618 that present information to the user 606. The output components 618 includes a display 620, where graphical features 622 are presented thereon. In an example, the display 620 is a touchscreen display. In an example, the graphical features 622 include a graphical user interface (GUI) of the client application 614. The output components 618 may also include a speaker and/or a haptic feedback device (not shown in FIG. 6).

Example operation of the computing environment 600 is now set forth. It is contemplated that the client application 614 is displaying text on the display 620 as part of the graphical features 622, where the text includes an identifier for an entity. The text may also include additional words. It is contemplated that the linker application 112 has performed the above-described processes to generate a link between the identifier for the entity in the text and an entry for the entity in the knowledge graph 110. In an example, the link is a hyperlink that is embedded in the identifier for the entity in the text. The client application 614 receives a selection of the link from the user 606. Upon receiving the selection of the link, the client application 614 transmits a query to the query application 602, where the query includes an identifier for the knowledge graph 110 and an identifier for an entry in the knowledge graph 110 corresponding to the entity referenced in the text shown on the display 620. The query application 602 identifies the knowledge graph 110 based upon the identifier for the knowledge graph 110 included in the query. The query application 602 searches the knowledge graph 110 based upon the identifier for the entry to retrieve the entry for the entity. The query application 602 transmits data from the entry for the entity in the knowledge graph 110 to the client application 614. Upon receiving the data, the client application 614 presents the data on the display 620 as part of the graphical features 622. According to some embodiments, the data from the entry for the entity is presented concurrently with the text on the display 620.

Figure 7A:
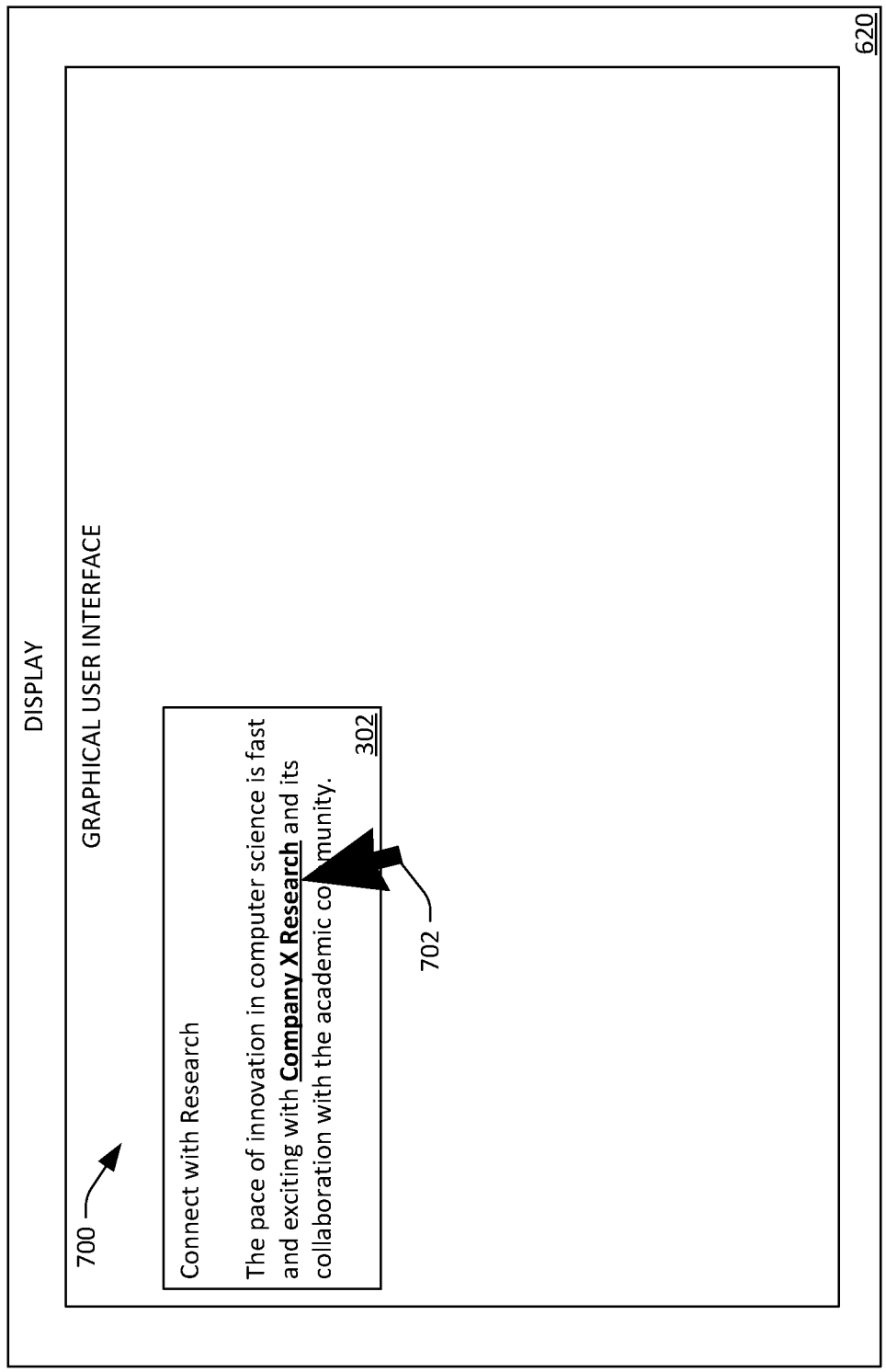
FIGS. 7A-B illustrate sequential views of an example graphical user interface (GUI).
Figure 7B:
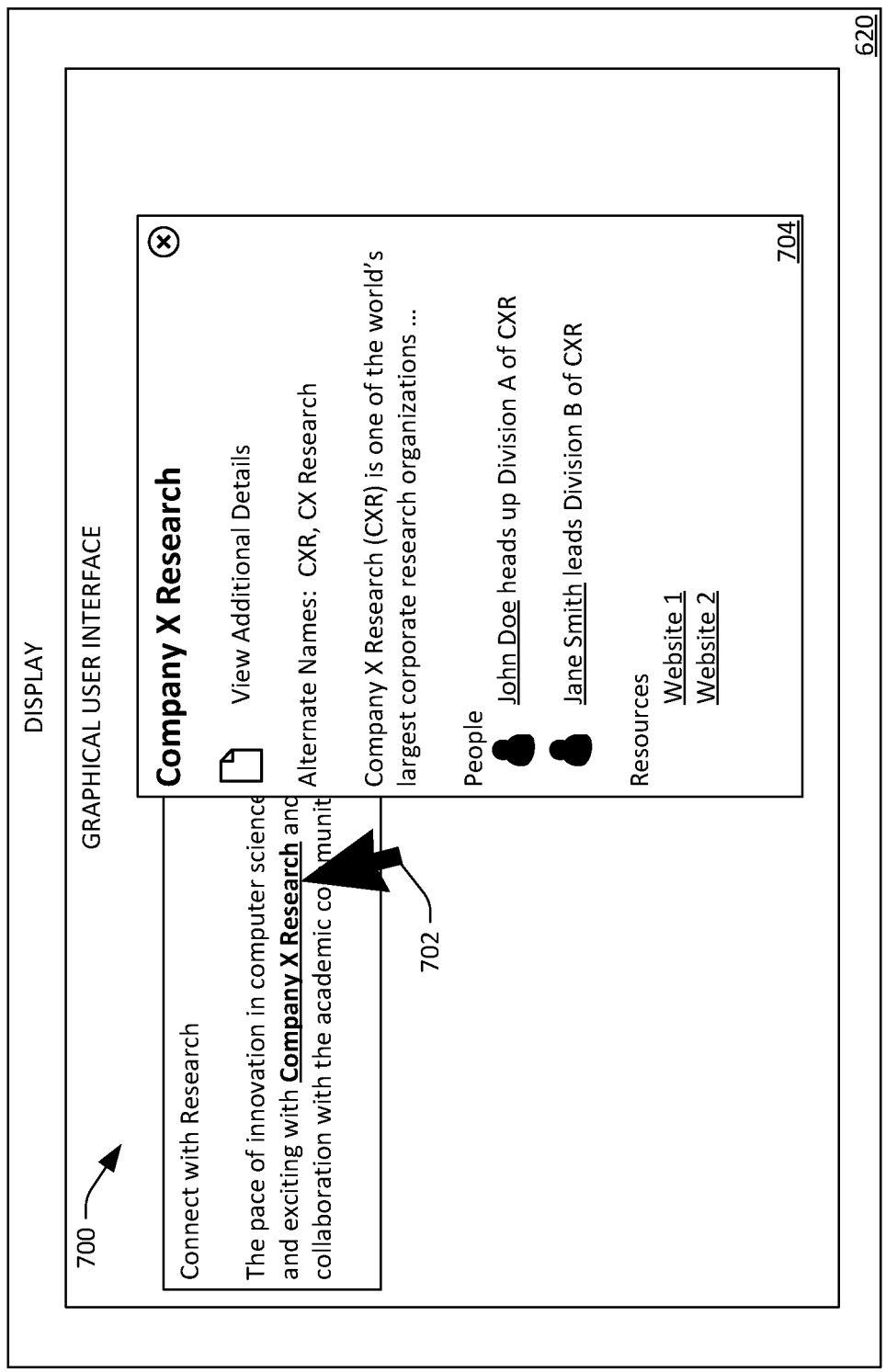

FIGS. 7A-B illustrate sequential views of an example graphical user interface (GUI) 700. The GUI 700 is presented on the display 620 as part of the graphical features 622 described above in the description of FIG. 6. Referring specifically now to FIG. 7A, the GUI 700 includes the text 302 (described above in the description of FIG. 3). The GUI 700 may also include additional text and/or other graphical data (not shown in FIG. 7A). The text 302 includes an identifier for an entity (e.g., "Company X Research"). The linker application 112 has generated a link (indicated in FIG. 7A by "Company X Research" being bolded and underlined) between the Company X Research entity in the text 302 and an entry for Company X Research in the knowledge graph 110. The GUI 700 receives a selection 702 of the link from the user 606.

Turning now to FIG. 7B, upon the selection 702 of the link, the knowledge graph 110 is queried (e.g., by the query application 602) and a window 704 is presented within the GUI 700 alongside the text 302. The window 704 includes data from the entry for "Company X Research" in the knowledge graph 110, where the data is based upon nodes and edges in the knowledge graph 110. As shown in FIG. 7B, the data in the window 704 includes alternate names (e.g., acronyms) for "Company X Research", a description of "Company X Research", people related to "Company X Research", and websites related to "Company X Research". Some or all of the data in the window 704 is selectable. In an example, when "John Doe" is selected within the window 704, the knowledge graph 110 is queried based upon an identifier for "John Doe", and data pertaining to "John Doe" from the knowledge graph 110 is presented to the user 606 on the display 620.

Although the linker application 112 has been described above as automatically identifying and selecting an identifier for entity in text, other possibilities are contemplated. According to some embodiments, the linker application 112 receives an indication from a user that an identifier for an entity in text that is currently being displayed to the user is to be linked to an entry in the knowledge graph 110.

Although the encoder 120 has been described above as computing relevance scores for entries for entities in the knowledge graph 110, other possibilities are contemplated. According to embodiments, a computer-implemented machine learning model (other than an encoder) computes relevance scores based upon the text 114 (including the identifier for the entity and the at least one additional word), titles for the entities in the knowledge graph 110, and descriptions of the entities in the knowledge graph 110.

Figure 8:
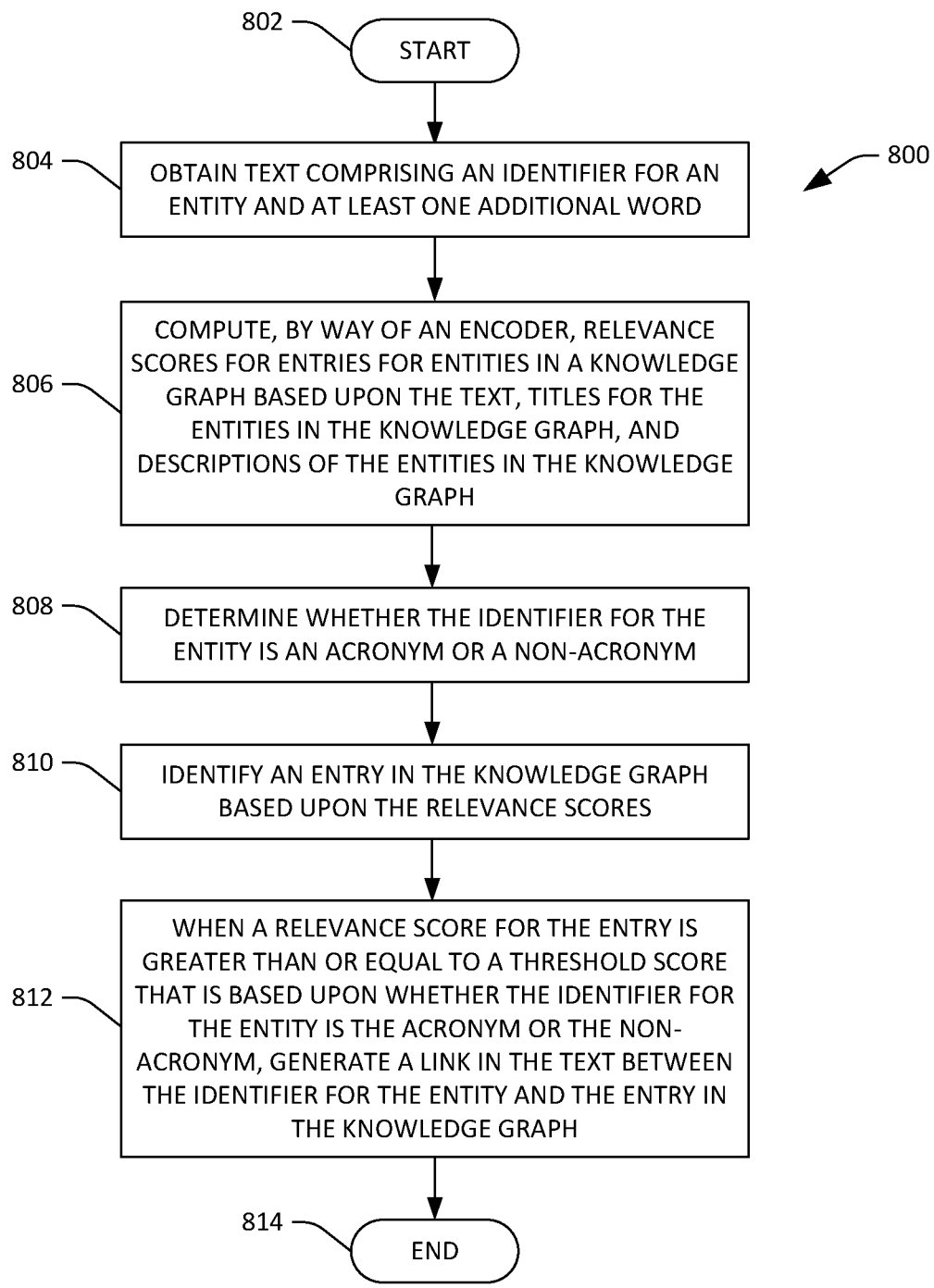
FIG. 8 is a flow diagram that illustrates an example methodology performed by a computing system for linking an entity referenced in computer-readable text to an entry for the entity in a knowledge graph.
Figure 9:
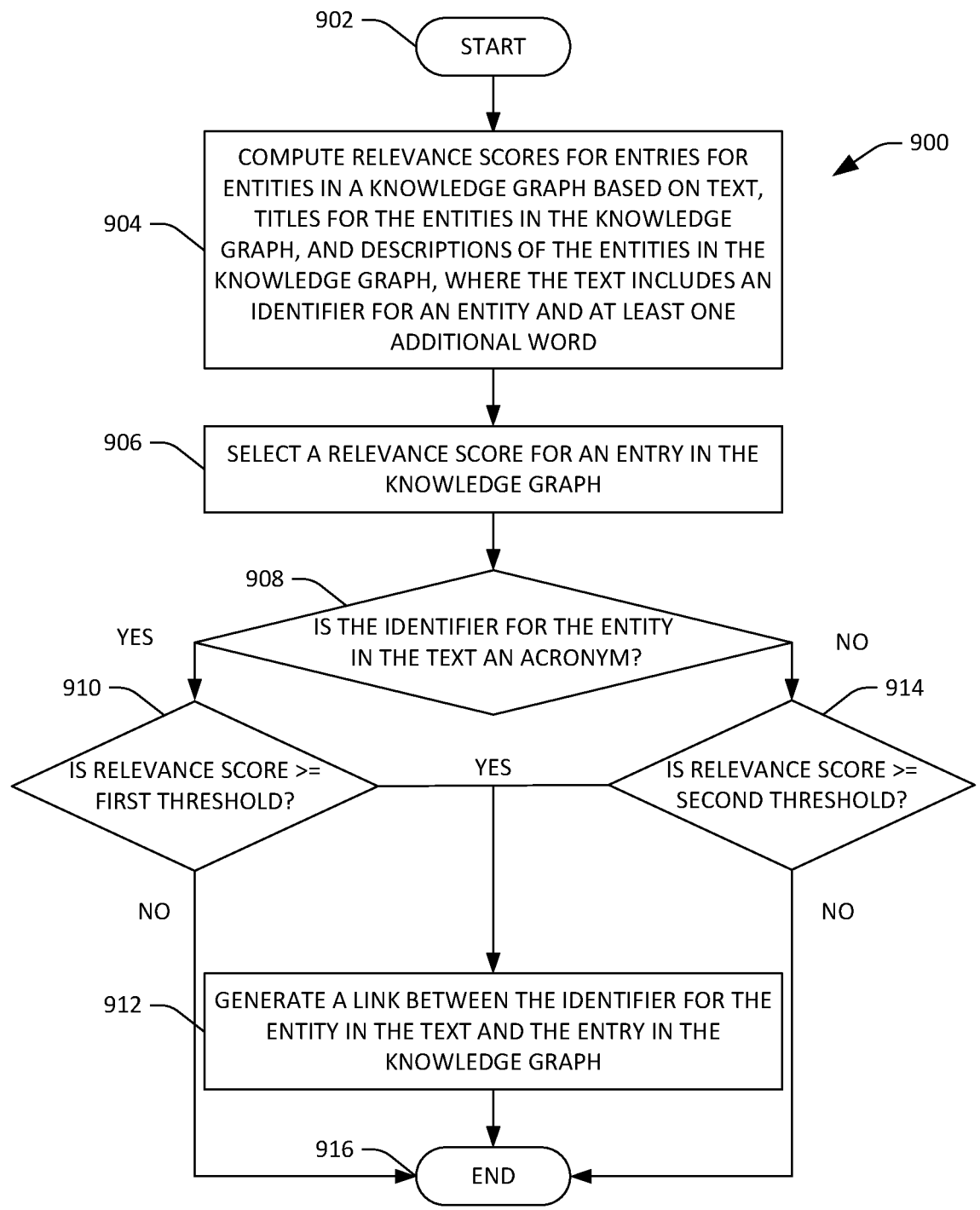
FIG. 9 is a flow diagram that illustrates an example methodology performed by a computing system for determining whether or not to link an entity referenced in computer-readable text to an entry in a knowledge graph.

FIGS. 8 and 9 illustrate example methodologies that facilitate linking identifiers for entities in computer-readable text to entries for the entities in a knowledge graph. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 8, a methodology 800 performed by a computing system for linking identifiers for entities in computer-readable text to entries for the entities in a knowledge graph is illustrated. The methodology 800 begins at 802, and at 804, the computing system obtains computer-readable text that includes an identifier for an entity and an additional word At 806, the computing system computes, by way of an encoder, relevance scores for entries for entities in a computer-implemented knowledge graph based upon the text, titles for the entities in the knowledge graph, and descriptions of the entities in the knowledge graph. At 808, the computing system determines whether the identifier for the entity is an acronym or a non-acronym. At 810, the computing system identifies an entry in the knowledge graph based upon the relevance scores. At 812, when a relevance score for the entry is greater than or equal to a threshold score, the computing system generates a link in the text between the identifier for the entity and the entry in the knowledge graph. The threshold score is based upon whether the identifier for the entity is an acronym or a non-acronym. Data from the entry in the knowledge graph is presented on a display to a user upon a computing device operated by the user receiving a selection of the link by the user, where the data corresponds to the entity. The methodology 800 concludes at 814.

Turning now to FIG. 9, a methodology 900 performed by a computing system for determining whether or not to link an identifier for an entity in computer-readable text to an entry in a knowledge graph is illustrated. The methodology 900 begins at 902, and at 904, the computing system computes, by way of an encoder, relevance scores for entries for entities in a knowledge graph based on the text, titles for the entities in the knowledge graph, and descriptions of the entities in the knowledge graph. The text includes an identifier for the entity and at least one additional word. At 906, the computing system selects a relevance score for an entry in the knowledge graph. In an example, the computing system selects a highest ranked relevance score from amongst the relevance scores.

At 908, the computing system determines whether the identifier for the entity in the text is an acronym. At 910, when the identifier for the entity in the text is an acronym, the computing system compares the relevance score for the entry in the knowledge graph to a first threshold score. At 912, when the relevance score is greater than or equal to the first threshold, the computing system generates a link between the identifier for the entity in the text and the entry in the knowledge graph such that when the link is selected in the text, data from the entry in the knowledge graph is presented to a user. When the relevance score is less than the first threshold score, the computing system does not generate the link. At 914, when the identifier for the entity in the text is not an acronym, the computing system compares the relevance score for the entry in the knowledge graph to a second threshold. When the relevance score is greater than or equal to the second threshold score, the computing system generates the link as described in 912. When the relevance score is less than the second threshold score, the computing system does not generate the link. The methodology 900 concludes at 916.

Figure 10:
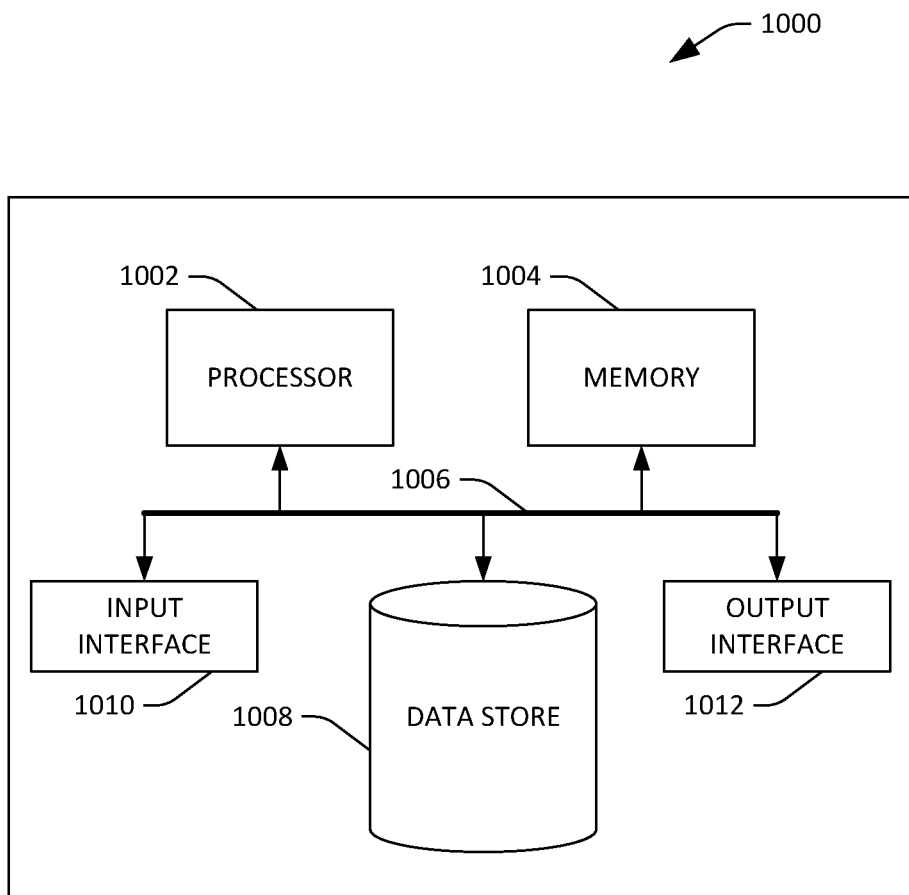
FIG. 10 is an example computing device.

Referring now to FIG. 10, a high-level illustration of an example computing device 1000 that can be used in accordance with the systems and methodologies disclosed herein is illustrated. In an example, the computing device 1000 is used in a system that links an identifier for an entity in computer-readable text to an entry in a knowledge graph that is assigned to the entity. By way of another example, the computing device 1000 is used in a system that presents information from a knowledge graph to a user upon a link in computer-readable text being selected by a user. The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store knowledge graphs, computer-readable text, computer-implemented models (e.g., cross-encoders, bi-encoders, entity recognizers), etc.

The computing device 1000 additionally includes a data store 1008 that is accessible by the processor 1002 by way of the system bus 1006. The data store 1008 may include executable instructions, knowledge graphs, computer-readable text, computer-implemented models (e.g., cross-encoders, bi-encoders, entity recognizers), etc. The computing device 1000 also includes an input interface 1010 that allows external devices to communicate with the computing device 1000. For instance, the input interface 1010 may be used to receive instructions from an external computer device, from a user, etc. The computing device 1000 also includes an output interface 1012 that interfaces the computing device 1000 with one or more external devices. For example, the computing device 1000 may display text, images, etc. by way of the output interface 1012.

It is contemplated that the external devices that communicate with the computing device 1000 via the input interface 1010 and the output interface 1012 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1000 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1000 may be a distributed system. Thus, for instance, several devices may be in communication by way of a network connection and may collectively perform tasks described as being performed by the computing device 1000.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. Such computer-readable storage media can include random-access memory (RAM), read-only memory (ROM), electrically erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The present disclosure relates to linking identifiers for entities in computer-readable text to entries for the entities in a knowledge graph according to at least the following examples provided in the section below:

(A1) In one aspect, some embodiments includes a method (e.g., 800) executed by a processor (e.g., 104) of a computing system (e.g., 102). The method includes obtaining (e.g., 804) computer-readable text (e.g., 114, 302) that includes an identifier for an entity and at least one additional word. The method further includes computing (e.g., 806), by way of an encoder (e.g., 120), relevance scores for entries for entities in a computer-implemented knowledge graph (e.g., 110, 200) based upon the text, titles for the entities in the knowledge graph, and descriptions of the entities in the knowledge graph. The method additionally includes determining (e.g., 808) whether the identifier for the entity is an acronym or a non-acronym. The method also includes identifying (e.g., 810) an entry in the knowledge graph based upon the relevance scores. The method further includes when a relevance score for the entry is greater than or equal to a threshold score, generating (e.g., 812) a link in the text between the identifier for the entity and the entry in the knowledge graph, where the threshold score is based upon whether the identifier for the entity is the acronym or the non-acronym, where data (e.g., 704) from the entry in the knowledge graph is presented on a display (e.g., 620) to a user (e.g., 606) upon a computing device (e.g., 604) operated by the user receiving a selection (e.g., 702) of the link by the user, and where the data corresponds to the entity.

(A2) In some embodiments of the method of A1, the entry in the knowledge graph has a highest relevance score from amongst the relevance scores.

(A3) In some embodiments of any of the methods of A1-A2, the threshold score is a first threshold score when the identifier for the entity is the acronym and the threshold score is a second threshold score when the identifier for the entity is the non-acronym.

(A4) In some embodiments of any of the methods of A1-A3, obtaining the text includes receiving the text from a second computing device over a network connection.

(A5) In some embodiments of any of the methods of A1-A4, the method further includes when the relevance score for the entry is less than the threshold score, outputting an indication that the identifier for the entity in the text cannot be linked to the entry in the knowledge graph.

(A6) In some embodiments of any of the methods of A1-A5, the at least one additional word includes a first word that occurs before the identifier for the entity in the text and a second word that occurs after the identifier for the entity in the text. Computing the relevance score for the entry includes generating a concatenation of the first word, the identifier for the entity, the second word, a title of the entity in the knowledge graph, a description of the entity in the knowledge graph, and a plurality of tokens, generating a vectorized representation of the text and the entry for the entity based upon the concatenation, and reducing the vectorized representation to a scalar value, where the relevance score is the scalar value.

(A7) In some embodiments of any of the methods of A1-A6, the text is presented on the display and the link is embedded in the identifier for the entity in the text.

(A8) In some embodiments of the method of A7, the data from the entry is presented on the display concurrently with the identifier for the entity in the text.

(B1) In another aspect, some embodiments include a computing system (e.g., 102) that includes a processor (e.g., 104) and memory (e.g., 106). The memory stores instructions that, when executed by the processor, cause the processor to perform any of the methods described herein (e.g., any of A1-A8).

(C1) In yet another aspect, some embodiments include a non-transitory computer-readable storage medium that includes instructions that, when executed by a processor (e.g., 104), cause the processor to perform any of the methods described herein (e.g., any of A1-A8).

(D1) In another aspect, some embodiments include a method executed by a computing system (e.g., 102) that includes a processor (e.g., 104) and memory (e.g., 106). The method includes obtaining computer-readable text (e.g., 114, 302) that includes an identifier for an entity and at least one additional word. The method further includes computing, by way of an encoder (e.g., 120), relevance scores for entries for entities in a computer-implemented knowledge graph (e.g., 110, 200) based upon the text, titles for the entities in the knowledge graph, and descriptions of the entities in the knowledge graph. The method additionally includes determining whether the identifier for the entity is an acronym or a non-acronym. The method also includes identifying an entry for the entity in the knowledge graph based upon the relevance scores and whether the identifier for the entity is the acronym or the non-acronym. The method further includes generating a link in the text between the identifier for the entity and the entry for the entity in the knowledge graph, where data (e.g., 704) from the entry for the entity in the knowledge graph is presented to a user (e.g., 606) upon the link being selected.

(D2) In some embodiments of the method of D1, the at least one additional word includes a first word that occurs before the identifier for the entity in the text and a second word that occurs after the identifier for the entity in the text. Computing a relevance score for the entry for the entity in the knowledge graph includes generating a concatenation of the first word, the identifier for the entity, the second word, a title of the entity in the knowledge graph, a description of the entity in the knowledge graph, and a plurality of tokens, generating a vectorized representation of the text and the entry for the entity based upon the concatenation, and reducing the vectorized representation to a scalar value, where the relevance score is the scalar value.

(D3) In some embodiments of any of the methods of D1-D2, a relevance score of the entry is indicative of a contextual similarity between the text and the entry for the entity in the knowledge graph.

(D4) In some embodiments of any of the methods of D1-D3, the encoder is a cross-encoder (e.g., 400).

(D5) In some embodiments of any of the methods of D1-D4, the text is from a web page.

(D6) In some embodiments of any of the methods of D1-D5, identifying the entry for the entity in the knowledge graph includes assigning ranks to the entries for the entities based upon the relevance scores and selecting the entry for the entity based upon the entry for the entity being assigned a highest rank amongst the ranks assigned to the entries.

(D7) In some embodiments of any of the methods of D1-D6, identifying the entry for the entity in the knowledge graph includes when the identifier for the entity in the text is the acronym, comparing a relevance score for the entry for the entity to a first threshold score, where the link is generated between the identifier for the entity in the text and the entry for the entity in the knowledge graph when the relevance score for the entry is greater than or equal to the first threshold score. Identifying the entry for the entity in the knowledge graph further includes when the identifier for the entity in the text is the non-acronym, comparing the relevance score for the entry for the entity to a second threshold score, where the link is generated between the identifier for the entity in the text and the entry for the entity in the knowledge graph when the relevance score for the entry is greater than or equal to the second threshold score.

(D8) In some embodiments of any of the methods of D1-D7, determining whether the identifier for the entity is the acronym or the non-acronym includes determining whether each character in the identifier for the entity is capitalized, when each character in the identifier for the entity is capitalized, determining that the identifier for the entity is the acronym, and when each character in the identifier for the entity is not capitalized, determining that the identifier for the entity is the non-acronym.

(D9) In some embodiments of any of the methods of D1-D8, the method further includes prior to computing the relevance scores and subsequent to obtaining the text, executing a search over the knowledge graph based upon the identifier for the entity. The method also includes identifying the entries for the entities based upon search results for the search.

(D10) In some embodiments of any of the methods of D1-D9, the link in the text between the identifier for the entity and the entry for the entity in the knowledge graph is generated only when a relevance score for the entry is greater than or equal to a threshold value, where the entity is not referenced in the knowledge graph when the relevance score is less than the threshold value.

(D11) In some embodiments of any of the methods of D1-D10, the identifier for the entity in the text is a name of the entity, where the knowledge graph includes a second entry for a second entity, and where the entity and the second entity share the name.

(E1) In another aspect, some embodiments include a computing system (e.g., 102) including a processor (e.g., 104) and memory (e.g., 106). The memory stores instructions that, when executed by the processor, cause the processor to perform any of the methods described herein (e.g., any of D1-D11).

(F1) In yet another aspect, some embodiments include a non-transitory computer-readable storage medium that includes instructions that, when executed by a processor (e.g., 104), cause the processor to perform any of the methods described herein (e.g., any of D1-D11).

(G1) In another aspect, some embodiments include a method performed by a computing system (e.g., 102) that includes a processor (e.g., 104). The method includes obtaining computer-readable text (e.g., 114, 302) comprising an identifier for an entity and at least one additional word. The method further includes computing, by way of an encoder (e.g., 120), relevance scores for entries for entities in a computer-implemented knowledge graph (e.g., 110, 200) based upon the text, titles for the entities in the knowledge graph, and descriptions of the entities in the knowledge graph. The method additionally includes assigning ranks to the entries for the entities based upon the relevance scores. The method also includes determining whether the identifier for the entity in the text is an acronym or a non-acronym. When the identifier for the entity is the acronym, the method includes comparing a relevance score for an entry in the knowledge graph having a highest rank to a first threshold score and when the relevance score is greater than or equal to the first threshold score, generating a link in the text between the identifier for the entity and the entry in the knowledge graph. When the identifier for the entity is the non-acronym, the method includes comparing the relevance score for the entry in the knowledge graph having the highest rank to a second threshold score and when the score is greater than or equal to the second threshold score, generating the link in the text between the identifier for the entity and the entry in the knowledge graph. Data (e.g., 704) from the entry in the knowledge graph is presented to a user upon the link being selected.

(H1) In another aspect, some embodiments include a computing system (e.g., 102) including a processor (e.g., 104) and memory (e.g., 106). The memory stores instructions that, when executed by the processor, cause the processor to perform any of the methods described herein (e.g., G1).

(I1) In yet another aspect, some embodiments include a non-transitory computer-readable storage medium that includes instructions that, when executed by a processor (e.g., 104) of a computing system (e.g., 102), cause the processor to perform any of the methods described herein (e.g., G1).

As used herein, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system, comprising:
   a processor; and
   memory storing instructions that, when executed by the processor, cause the processor to perform acts comprising:
   obtaining computer-readable text comprising an identifier for an entity and at least one additional word;
   computing, by way of an encoder, relevance scores for entries for entities in a computer-implemented knowledge graph based upon the text, titles for the entities in the knowledge graph, and descriptions of the entities in the knowledge graph;
   determining whether the identifier for the entity is an acronym or a non-acronym;
   identifying an entry for the entity in the knowledge graph based upon the relevance scores and whether the identifier for the entity is the acronym or the non-acronym; and
   generating a link in the text between the identifier for the entity and the entry for the entity in the knowledge graph, wherein data from the entry for the entity in the knowledge graph is presented to a user upon the link being selected.

2. The computing system of claim 1, wherein the at least one additional word comprises a first word that occurs before the identifier for the entity in the text and a second word that occurs after the identifier for the entity in the text, wherein computing a relevance score for the entry for the entity in the knowledge graph comprises:
   generating a concatenation of the first word, the identifier for the entity, the second word, a title of the entity in the knowledge graph, a description of the entity in the knowledge graph, and a plurality of tokens;
   generating a vectorized representation of the text and the entry for the entity based upon the concatenation; and
   reducing the vectorized representation to a scalar value, wherein the relevance score is the scalar value.

3. The computing system of claim 1, wherein a relevance score of the entry is indicative of a contextual similarity between the text and the entry for the entity in the knowledge graph.

4. The computing system of claim 1, wherein the encoder is a cross-encoder.

5. The computing system of claim 1, wherein the text is from a web page.

6. The computing system of claim 1, wherein identifying the entry for the entity in the knowledge graph comprises:
   assigning ranks to the entries for the entities based upon the relevance scores; and
   selecting the entry for the entity based upon the entry for the entity being assigned a highest rank amongst the ranks assigned to the entries.

7. The computing system of claim 1, wherein identifying the entry for the entity in the knowledge graph comprises:
   when the identifier for the entity in the text is the acronym, comparing a relevance score for the entry for the entity to a first threshold score, wherein the link is generated between the identifier for the entity in the text and the entry for the entity in the knowledge graph when the relevance score for the entry is greater than or equal to the first threshold score; and
   when the identifier for the entity in the text is the non-acronym, comparing the relevance score for the entry for the entity to a second threshold score, wherein the link is generated between the identifier for the entity in the text and the entry for the entity in the knowledge graph when the relevance score for the entry is greater than or equal to the second threshold score.

8. The computing system of claim 1, wherein determining whether the identifier for the entity is the acronym or the non-acronym comprises:
   determining whether each character in the identifier for the entity is capitalized;
   when each character in the identifier for the entity is capitalized, determining that the identifier for the entity is the acronym; and
   when each character in the identifier for the entity is not capitalized, determining that the identifier for the entity is the non-acronym.

9. The computing system of claim 1, the acts further comprising:
   prior to computing the relevance scores and subsequent to obtaining the text, executing a search over the knowledge graph based upon the identifier for the entity; and
   identifying the entries for the entities based upon search results for the search.

10. The computing system of claim 1, wherein the link in the text between the identifier for the entity and the entry for the entity in the knowledge graph is generated only when a relevance score for the entry is greater than or equal to a threshold value, wherein the entity is not referenced in the knowledge graph when the relevance score is less than the threshold value.

11. The computing system of claim 1, wherein the identifier for the entity in the text is a name of the entity, wherein the knowledge graph includes a second entry for a second entity, wherein the entity and the second entity share the name.

12. A method executed by a processor of a computing system, the method comprising:
   obtaining computer-readable text comprising an identifier for an entity and at least one additional word;
   computing, by way of an encoder, relevance scores for entries for entities in a computer-implemented knowledge graph based upon the text, titles for the entities in the knowledge graph, and descriptions of the entities in the knowledge graph;
   determining whether the identifier for the entity is an acronym or a non-acronym;
   identifying an entry in the knowledge graph based upon the relevance scores; and
   when a relevance score for the entry is greater than or equal to a threshold score, generating a link in the text between the identifier for the entity and the entry in the knowledge graph, wherein the threshold score is based upon whether the identifier for the entity is the acronym or the non-acronym, wherein data from the entry in the knowledge graph is presented on a display to a user upon a computing device operated by the user receiving a selection of the link by the user, wherein the data corresponds to the entity.

13. The method of claim 12, wherein the entry in the knowledge graph has a highest relevance score from amongst the relevance scores.

14. The method of claim 12, wherein the threshold score is a first threshold score when the identifier for the entity is the acronym, wherein the threshold score is a second threshold score when the identifier for the entity is the non-acronym.

15. The method of claim 12, wherein obtaining the text comprises receiving the text from a second computing device over a network connection.

16. The method of claim 12, further comprising:
when the relevance score for the entry is less than the threshold score, outputting an indication that the identifier for the entity in the text cannot be linked to the entry in the knowledge graph.

17. The method of claim 12, wherein the at least one additional word comprises a first word that occurs before the identifier for the entity in the text and a second word that occurs after the identifier for the entity in the text, wherein computing the relevance score for the entry comprises:
generating a concatenation of the first word, the identifier for the entity, the second word, a title of the entity in the knowledge graph, a description of the entity in the knowledge graph, and a plurality of tokens;
generating a vectorized representation of the text and the entry for the entity based upon the concatenation; and
reducing the vectorized representation to a scalar value, wherein the relevance score is the scalar value.

18. The method of claim 12, wherein the text is presented on the display, wherein the link is embedded in the identifier for the entity in the text.

19. The method of claim 18, wherein the data from the entry is presented on the display concurrently with the identifier for the entity in the text.

20. A non-transitory computer-readable storage medium comprising instructions that, when executed by a processor, cause the processor to perform acts comprising:
obtaining computer-readable text comprising an identifier for an entity and at least one additional word;
computing, by way of an encoder, relevance scores for entries for entities in a computer-implemented knowledge graph based upon the text, titles for the entities in the knowledge graph, and descriptions of the entities in the knowledge graph;
assigning ranks to the entries for the entities based upon the relevance scores;
determining whether the identifier for the entity in the text is an acronym or a non-acronym;
when the identifier for the entity is the acronym:
comparing a relevance score for an entry in the knowledge graph having a highest rank to a first threshold score; and
when the relevance score is greater than or equal to the first threshold score, generating a link in the text between the identifier for the entity and the entry in the knowledge graph; and
when the identifier for the entity is the non-acronym:
comparing the relevance score for the entry in the knowledge graph having the highest rank to a second threshold score; and
when the score is greater than or equal to the second threshold score, generating the link in the text between the identifier for the entity and the entry in the knowledge graph,
wherein data from the entry in the knowledge graph is presented to a user upon the link being selected.

* * * * *